Jan. 15, 1963  E. HÄNLE  3,073,585
ANNULAR SPRING
Filed April 11, 1960

INVENTOR
EUGEN HÄNLE
by
Bailey, Stephens & Huettig
ATTORNEYS

United States Patent Office 3,073,585
Patented Jan. 15, 1963

3,073,585
ANNULAR SPRING
Eugen Hänle, Schlattstall, Kreis Nurtingen, Germany
Filed Apr. 11, 1960, Ser. No. 21,271
Claims priority, application Germany Apr. 11, 1959
2 Claims. (Cl. 267—9)

The present invention relates to an annular spring with interior and exterior rings, which rings contact each other at conical faces.

Annular springs made of steel have already found application for a long time as spring elements. This type of springs is characterized by a particularly high damping and an extremely good quality coefficient, which coefficient is defined as the energy of the deformation of the spring in relation to the weight of the spring. By the alteration of the number of the spring rings combined in a spring column, such a spring can be adapted in simple manner to the amount of the spring energy absorbed.

This property renders the annular springs particularly suitable for the application in the construction of shock absorbers, buffers etc.

The production of the steel rings is, however, connected with considerable expenditure. The rings must be rolled of a special steel and then polished at their exterior respectively interior sides. Further the spring elements made of steel are not corrosion resistant and require a special lubrication.

According to the invention the rings consist of glass fibers kept together by a binding agent, which fibers are arranged in such a manner, that these can preferably be subjected to tensile and/or pressure stresses.

Thin glass fibers subjected to tensile stresses do show in respect to steel an extremely high specific energy of deformation $$\frac{\sigma^2}{2E\gamma}$$

($\sigma$=maximum tensile stress, $E$=Young's modulus, $\gamma$=specific density), when a sufficiently small diameter is selected.

The novel annular spring in consequence shows a quality coefficient which is up to twenty times higher than the coefficient of prior known annular springs made of steel. The novel annular rings can be produced extremely cheap as articles in bulk, and the springs constructed of these do show the feature of a small weight. These rings are substantially corrosion resistant and are on account of their special properties particularly suitable for the application in air craft construction, e.g. for the equipment of shock absorbing struts with springs.

In contrast to the prior expert opinion, according to which glass fibers are only to be subjected to tensile stresses, these fibers are now also subjected to pressure stresses, in the interior rings of the novel springs. Experiments have shown that upon suitable application of force the glass fibers can absorb very high pressure loads.

The glass fibers can either be wound in self-supporting manner in the form of the spring rings, or these can be wound into particularly formed supporting rings. These are kept together by binding agents, preferably consisting of plastic resins.

The interior rings of the annular springs can also consist of steel or another high strength material. According to this embodiment the interior ring is not required to contribute substantially to the spring action upon actuation of the spring. In order to prevent corrosion the surface of the interior ring can be e.g. chromium plated. It is also not required to construct this ring of a particularly high-grade steel.

For improvement of the damping characteristics of the novel springs, as well as for the decrease of their wear, there can be added a lubricant to the binding agent keeping the fibers together and/or to the material of the supporting ring. The addition of such a lubricant, e.g. molybdenum sulfide or similar permits the construction of substantially self-lubricating springs not requiring maintenance work.

Finally the interior and exterior rings of the springs can each be polished at the friction faces, in order to thus further decrease the wear.

In the drawing there are shown three embodiments of the subject matter of the present invention, all of which are in axial section. In the drawing.

Figure 1:
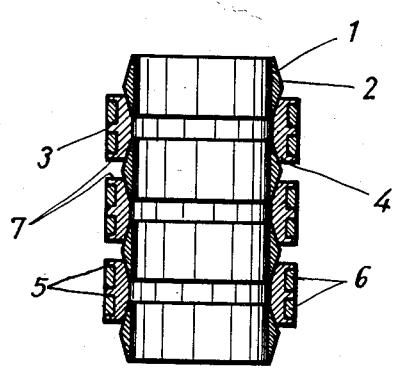
FIGURE 1 is an annular spring according to the invention, the exterior ring consisting of glass fiber material, and the interior ring of steel.

The interior rings 1 made of steel of the annular spring (FIGURE 1) are formed conically at their exterior faces 2. The surface of these is polished. The exterior rings 3 comprise the supporting rings 4 made of polyamide or a similar plastic. Into the annular grooves 5 turned out of the exterior face is wound in longitudinal and substantially parallel direction glass fiber material 6, which material is embedded in a binding agent, e.g. a plastic resin, and kept together by this resin. The interior face of the supporting rings 4 is also formed conically. The individual interior rings 1 and the exterior rings 3 provided with glass fiber material 6 are assembled in known manner under formation of the annular spring. The maximum pitch of spring of the thus constructed spring is given in that upon a definite maximum load the respective lateral faces 7 of the individual exterior rings 3 abut on each other.

Figure 2:
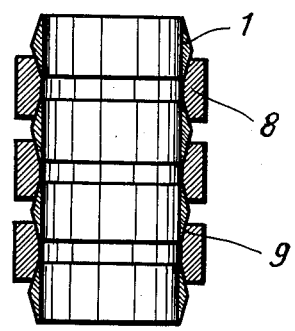
FIGURE 2 is such an annular spring according to another embodiment.

According to another embodiment of the spring (FIGURE 2) also being provided with interior rings 1 made of steel, the exterior rings 8 are wound in self-supporting manner without the use of a supporting ring. The fiber material is maintained by the binding agent in the desired form. The interior face 9 of the exterior ring 8 is in each case also of conical form. This face can be machined for an improvement of the sliding properties of the spring, there is, however, to be noted that the glass fibers must be injured as little as possible during this processing.

According to the third embodiment (FIGURE 3) of the annular spring, the interior rings 10 and the exterior rings 11 are both made of glass fiber material. The glass fiber material is wound in self-supporting manner and cured with the binding agent. The exterior faces of the interior ring 10 and the interior faces of the exterior ring 11 can also be machined.

Figure 3:
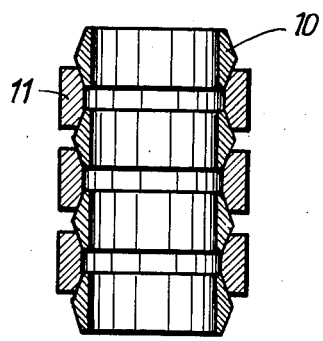
FIGURE 3 is an annular spring according to the invention, the interior ring of which also consists of glass fiber material.

The pitch of spring of the complete spring column is fixed in all embodiments by the exterior rings abutting against each other in the further above described manner. It is to be understood that the invention is not restricted to a spring column of four interior rings, but the number of the interior and exterior rings can rather be selected with any desirable number. It also falls within the scope of the invention to construct the supporting body 4 of the exterior ring in another manner than shown in FIGURE 1. In particular there can be arranged several or also no grooves at all. The sectional form of the interior and exterior rings can also considerably deviate from the form illustrated, as is already known in respect to annular springs made of steel. It is further conceivable that the interior rings of the spring according to FIGURE 3 are provided with a supporting ring, into which the glass fiber material, similar to FIGURE 1, is wound longitudinally in substantially parallel manner.

Finally the friction faces can be formed of a special material e.g. metal, or glass fiber textile or similar, in order to thus provide the spring with special properties. For the same purpose it is finally possible to knead the glass fiber material e.g. with a resin capable of sliding.

As glass fiber material there can be found applicable spinning fibers, elementary fibers, rovings or similar products wound parallel or twisted in opposite direction.

What I claim is:

1. A ring spring buffer device of the type characterized by a plurality of cooperating pairs of circularly continuous rings wherein the inner surface of the first ring is formed with a taper mating with and contacting a corresponding taper formed on the outer surface of a second ring, said rings being formed of plastic material and being adapted to engage one another along said mating tapers whenever an axial load is supplied which tends to drive one ring into the other in telescoping fashion, in which said contacting mating surfaces are composed of plastic material, and in which each ring includes a plurality of glass threads running therearound and embedded in plastic material.

2. A device as claimed in claim 1, in which those portions of the plastic material at the mating faces have a lubricant material incorporated therein.

References Cited in the file of this patent

UNITED STATES PATENTS

| | | |
|---|---|---|
| 1,967,088 | Geyer | July 17, 1934 |
| 2,715,617 | White | Aug. 16, 1955 |
| 2,948,526 | Maier | Aug. 9, 1960 |

FOREIGN PATENTS

| | | |
|---|---|---|
| 737,615 | Germany | July 17, 1943 |